US007265961B2

(12) United States Patent
D'Alessandro

(10) Patent No.: US 7,265,961 B2
(45) Date of Patent: Sep. 4, 2007

(54) LIGHTNING PROTECTION DEVICE AND METHOD

(75) Inventor: Franco D'Alessandro, Mt. Stuart (AU)

(73) Assignee: ERICO International Corporation, Solon, OH (US)

( * ) Notice: Subject to any disclaimer, the term of this patent is extended or adjusted under 35 U.S.C. 154(b) by 428 days.

(21) Appl. No.: 10/611,574

(22) Filed: Jul. 1, 2003

(65) Prior Publication Data
US 2005/0146832 A1   Jul. 7, 2005

(51) Int. Cl.
*H02H 1/00* (2006.01)
(52) U.S. Cl. .................. 361/117; 361/56; 361/111; 361/118
(58) Field of Classification Search ........... 361/117, 361/111, 118, 56
See application file for complete search history.

(56) References Cited

U.S. PATENT DOCUMENTS

| 4,571,656 | A | * | 2/1986 | Ruckman .................. 361/56 |
| 4,652,694 | A | * | 3/1987 | Goldman et al. ............ 174/3 |
| 4,760,213 | A | * | 7/1988 | Gumley .................... 174/3 |
| 5,652,690 | A | * | 7/1997 | Mansfield et al. ......... 361/127 |
| 6,320,119 | B1 |  | 11/2001 | Gumley |
| 6,649,825 | B2 | * | 11/2003 | Rapp ..................... 174/5 R |
| 6,683,772 | B2 | * | 1/2004 | Fowler et al. ............ 361/117 |

FOREIGN PATENT DOCUMENTS

AU    WO94/17578  A1  *  8/1994

OTHER PUBLICATIONS

D'Alessandro and Gumley. Electric Field Modelling of Structures Under Thunderstorm Conditions. Erico Lightning Technologies, Australia [online] [retrieved Oct. 3, 2003]. Retrieved from the Internet URL: http://www.erico.com/erico_public/general_info/ERITECHLPTechNotes.asp.

D'Alessandro and Gumley. A Modern Perspective on Direct Strike Lightning Protection. Erico Lightning Technologies, Australia [online] [retrieved Oct. 3, 2003]. Retrieved from the Internet URL: http://www.erico.com/erico_public/general_info/ERITECHLPTechNotes.asp.

* cited by examiner

*Primary Examiner*—Michael Sherry
*Assistant Examiner*—Terrence R. Willoughby
(74) *Attorney, Agent, or Firm*—Renner, Otto, Boisselle & Sklar, LLP

(57) ABSTRACT

An air terminal for lightning protection includes a central rod and a curved conductive surface around the central rod. The central rod includes a tip mount for receiving a tip from a tip set that includes a plurality of tips that impart different electrical characteristics to the air terminal. For example, the tips of the tip set may have a variety of radii of curvature, and may provide different gap sizes between the various tips and the curved conductive surface. The curved conductive surface and the grounded central rod may be electrically coupled together via an electrical connection. The electrical connection may include a fixed impedance or resistance, or may include a variable impedance unit that automatically varies impedance based on a voltage difference between the curved conductive surface and the grounded central rod.

18 Claims, 3 Drawing Sheets

LIGHTNING PROTECTION DEVICE AND METHOD

BACKGROUND OF THE INVENTION

1. Field of the Invention

This invention relates generally to lightning protection devices and methods, and more particularly to lightning air terminals and a method of design and application of such terminals.

2. Description of the Related Art

In the field of practical lightning protection, there is a wide spectrum of technologies currently being used. At one end of this spectrum there are the air terminals claiming enhanced or more consistent performance. Whether these terminals enhance or retard corona development, or whether they are blunt or sharp, they have been broadly categorized under a generic term "ESE" meaning Early Streamer Emission.

In the center of the spectrum there is the conventional practice widely specified in various Standards. This practice currently uses an "electrogeometric" model known as the "rolling sphere method" which was adapted from lightning strike measurements relevant to the electric power transmission industry. Transmission lines are remarkable for their essentially two dimensional aspect and uniformity of height and conductor diameter. Hence, the rolling sphere method could take little or no account of variations in electric field enhancement, such as is the case for different air terminal configurations and point of placement on structures. Nevertheless, the method was adopted for direct application to the protection of three dimensional and other complex, geometrical structures.

Within the Standards there is permitted a widely divergent practice. This may vary from a small number of, for example, six-meter-high Franklin rods, to much shorter terminals, sometimes called finals, spaced at closer intervals. There are also systems with no vertical terminals, sometimes called Faraday systems, which include conductors laid horizontally on exposed surfaces.

At the other end of the spectrum are the systems that claim to prevent lightning attachment by the use of arrays of sharp points designed to produce abundant corona. The corona is claimed to discourage upward leader development and discharge the thundercloud, causing the lightning to strike elsewhere.

While none of the above techniques offer perfection, there is room to improve the performance of air terminals and their location through a better understanding of the attachment process. What follows is one explanation of the attachment process, although it will be appreciated that actual attachment processes may deviate from below-described process.

There are four phases in the attachment process of lightning to a ground point. The first is the quasi-static phase where electrical fields build below a storm cloud over some tens of minutes. These fields cause ground objects to be electrically stressed and, depending on their height and geometric shape, they will emit corona. In the case of a negative cloud base, this corona is in the form of positive ions that create a space charge volume above the object.

In the longer term, these positive ions, which in reality are molecules of air, ascend with typical velocities of 1 ms$^{-1}$ in fields of 10 kVm$^{-1}$. They create non-linearity in the field to heights of several hundred meters. Thus, the electric field strength observed at ground becomes modified before any dynamic event occurs. Typical ambient fields of 50 kVm$^{-1}$ have been recorded as reducing to values below 5 kVm$^{-1}$ near ground.

The second phase relates to the approach of a downward leader, a filament discharge with average velocity of approximately 10$^5$ ms$^{-1}$ when pauses of 20-50 μs (microseconds) are taken into account. The inter-pause or step velocities can exceed 10$^6$ ms$^{-1}$. This conveyance of charge toward ground causes a rapid increase in the field strength observed by ground points. There is very small initial change in the ground observed electric field strength when the leader is at high altitude, but with near approach, values will be escalating at a typical rate of 10$^9$ Vm$^{-1}$s$^{-1}$.

The third phase is when electric field strength observed by a ground point reaches the critical value to create avalanche breakdown near the tip of ground points. This process commences with an initial corona burst and the development of a "streamer zone". The streamer zone initially extends from the tip of the object out to, typically, 0.5-1 meter from the object and is comprised of many filamentary discharges called "streamers". One of these streamers may eventually become thermalised, forming a leader stem. Provided the field strength is sufficient, a new streamer zone then develops ahead of the leader. This process repeats as the leader discharge propagates upwards, toward the approaching downward lightning leader. Electric field computations can be made to quantify the point at which these processes will occur during this third phase, based on the height and ground electrode curvature amongst other things. Streamer development fields may also be determined in the laboratory, but it has proven difficult to perform laboratory experiments to readily model the field decay from the surface to the first few meters above a terminal, and eventually to the "ambient" value. The "ambient" field is defined as the unperturbed electric field, i.e., that which would exist in the absence of the object. There is a minimum value of the field required to convert a streamer into a propagating upward leader.

The fourth phase is the continuing propagation of the upward leader. Once the stem of an upward leader is formed, an electric field of 400-500 kVm$^{-1}$ is required in the streamer zone to provide the necessary energy to continue propagation.

Embedded within the above four phases is another spectrum based on the strength of electric field to cause breakdown of air, and the electric field strength required for streamer-leader inception. The former value has a nominal value of 3 MVm$^{-1}$. The latter value falls within the range 400-500 kVm$^{-1}$ for positive streamer-leaders (the most common polarity for upward discharges). Of course, in nature these values will never be exact, with some parameters varying by orders of magnitude.

There is a wide variation in geometric shape of ground points which range from sharp points to flat horizontal surfaces. At one end of the geometric shape spectrum is the pointed Franklin rod. Should this rod produce a field intensification of 1000:1, then 3 MVm$^{-1}$ at the tip is reached when the ambient field is only 3 kVm$^{-1}$. No streamer development or propagation is possible in such low ambient fields but a continuing corona emission will provide an ascending space charge of ionized air molecules in periods long before the initiation and descent of a downward leader.

As the center of this spectrum is approached, the field intensification progressively reduces. The center is reached when, for example, a value of 6:1 is achieved over a critical range for the particular terminal configuration. This center of the spectrum would typically be a "blunt" rod which has a rounded upper surface of a given radius. In this case, the field strength at the tip of the rod reaches a corona emission level of 3 MVm$^{-1}$ at the time when the ambient field reaches the leader propagation level of 500 kVm$^{-1}$.

At the other extreme of this spectrum is a flat surface with unity field intensification. Hence, the downward leader needs to approach very closely to produce 3 MVm$^{-1}$ at the surface. In this case, air ionization, corona emission and breakdown occur simultaneously.

This spectrum leads to a number of conclusions, namely, that an elevated sharp point becomes unnecessarily active too early in the process, by producing field-reducing corona along with space charge. This blanket of charged particles lying above the grounded point will, to a varying extent, mask the field due to the approaching downward leader. The result is that the downward leader must approach much closer in order to force the creation of an upward leader. It has been discovered that a rounded surface will provide a better performance by minimizing pre-discharge corona and, by suitable radius or diameter dimension and initiate streamers only when the ambient field can support their conversion into a stable leader.

Hereafter, three different types of air terminals will be referred to, viz.:

(I) A fully grounded conductor as specified in various Standards, i.e., a Franklin rod which is a long cylindrical conductor with a sharp, conical tip, the shorter final version, or the rodless system of copper tapes commonly known as the Faraday system. Henceforth, these types of air terminal shall be referred to as "conventional passive".

(II) A particular type of air terminal comprising a curved conductor, typically a sphere, placed on a conductive rod. The radius of curvature and overall height of this air terminal may be dimensioned according to the method described in Gumley, U.S. Pat. No. 6,320,119, which is herein incorporated by reference in its entirety. Hereafter, this type of air terminal shall be referred to as "RFI passive", RFI being the acronym for "reduced field intensification".

(III) A particular type of curved surface air terminal comprising one or more insulated components which result in a triggering arc to enhance the initiation of the lightning attachment process; henceforth, this type of air terminal shall be referred to as "RFI triggering".

One example of a prior Type III system is that disclosed in Gumley, U.S. Pat. No. 4,760,213. Such Type III terminals are widely sold under the trademark DYNASPHERE™ by ERICO, Inc. of Solon, Ohio, USA.

The DYNASPHERE™ terminal utilizes a generally spherical or ellipsoidal curved surface electrode which is connected to the grounded central conductor via a high impedance current drain. An annular air gap is provided between the top of the generally spherical surface and the top of the central grounded conductor. Such lightning air terminals have a number of parameters such as the size and shape of the spherical surface, the size of the air gap, the shape of the tip of the central grounded conductor, the height of the terminal above the structure to be protected, and the location of the air terminal on the structure. One primary parameter is known as the "electric field intensification factor" which is derived from the height and curvature of the curved surface electrode. These factors have never before been defined in relation to practical lightning protection systems.

U.S. Pat. No. 6,320,119 describes: (i) certain improvements of Type I lightning air terminals, viz. the Type II terminals, (ii) certain improvements in the Type III system described in U.S. Pat. No. 4,760,213, and (iii) a method of design and application of the Type II & III air terminals. Terminals described in U.S. Pat. No. 6,320,119 are also available from ERICO, Inc.

It will be appreciated that further improvements may be desirable for lightning protection systems and methods.

SUMMARY OF THE INVENTION

According to an aspect of the invention, a lightning protection device includes a grounded central rod, wherein the central rod includes a tip mount at one end; a conductive tip coupled to the central rod at the tip mount; a curved conductive shell capacitively spaced from the tip and the central rod, with an annular gap between the conductive shell and the tip that functions as a spark gap; and an electrical connection joining the conductive shell to ground. The conductive tip is one of a set of tips that may be coupled to the tip mount of the central rod, wherein the tips impart different electrical characteristics to the lightning protection device.

According to another aspect of the invention, a lightning protection device includes a grounded central rod, wherein the central rod includes a tip mount at one end; a conductive tip coupled to the central rod at the tip mount; a curved conductive shell capacitively spaced from the tip and the central rod, with an annular gap between the conductive shell and the tip that functions as a spark gap; and an electrical connection between the conductive shell and the central rod. The electrical connection includes a variable impedance unit.

According to yet another aspect of the invention, a method of lightning protection using a lightning protection device, includes: controlling electric field distribution characteristics in the vicinity of the device; and controlling spark production characteristics of the device. The controlling the spark production characteristics includes: controlling width of a spark gap between a central grounded rod of the device and a conductive shell of the device; and providing an electrical connection between the central grounded rod and the conductive shell.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale.

DETAILED DESCRIPTION

An air terminal for lightning protection includes a central rod and a curved conductive surface around the central rod. The central rod includes a tip mount for receiving a tip from a tip set that includes a plurality of tips that impart different electrical characteristics to the air terminal. For example, the tips of the tip set may have a variety of radii of curvature, and may provide different gap sizes between the various tips and the curved conductive surface. The curved conductive surface and the grounded central rod may be coupled together via an electrical connection. The electrical connection may include a fixed impedance or resistance, or may include a variable impedance unit that automatically varies impedance based on a voltage difference between the curved conductive surface and the grounded central rod. The tip set with plurality of tips, and/or the variable impedance unit, may allow for improved performance of the air terminal for a variety of installation situations, such as installation on buildings with different dimensions, such as buildings with different heights and/or widths.

Figure 1:
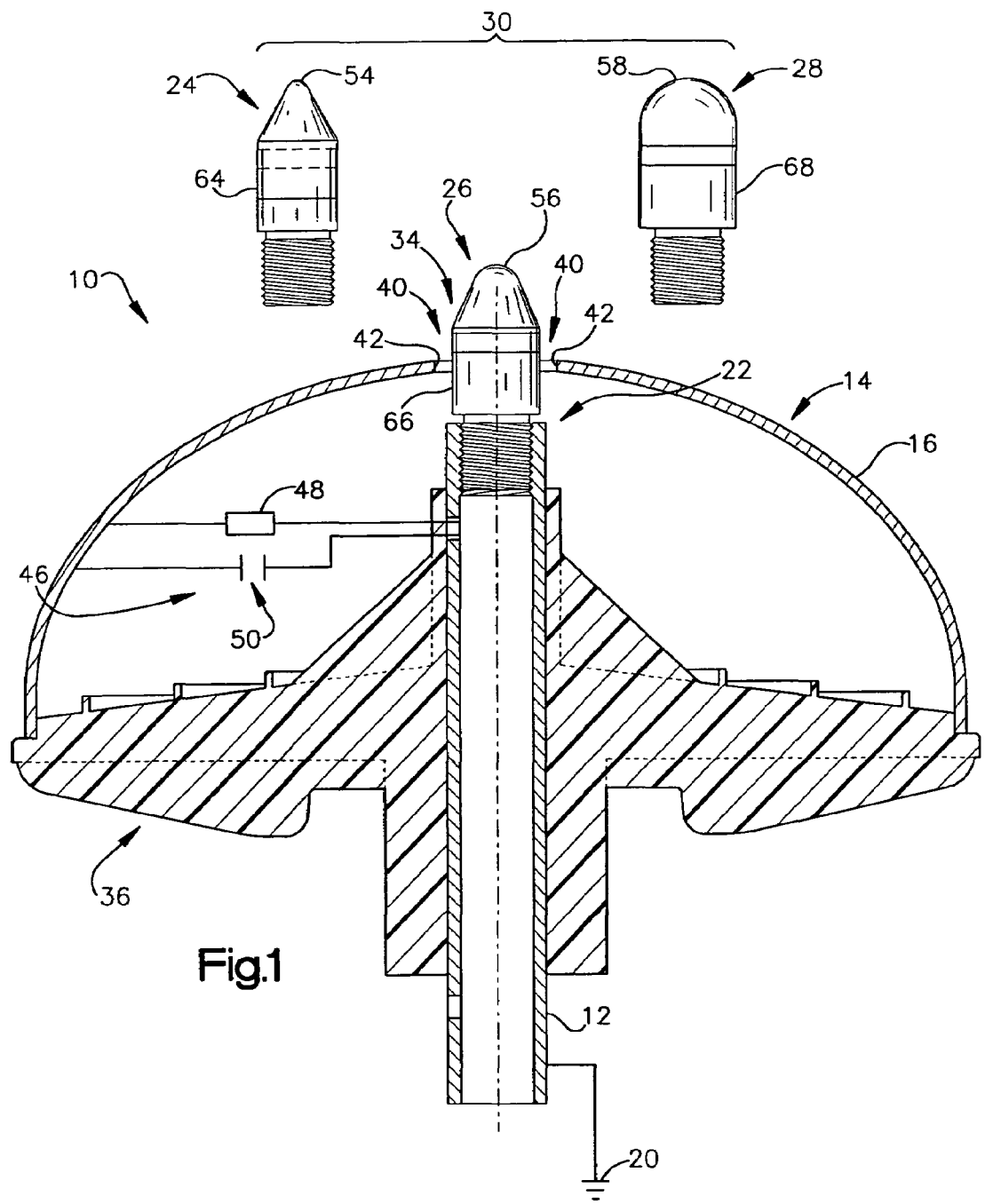
FIG. 1 is a cross-sectional side view of a lightning protection system in accordance with the present invention.
Figure 2:
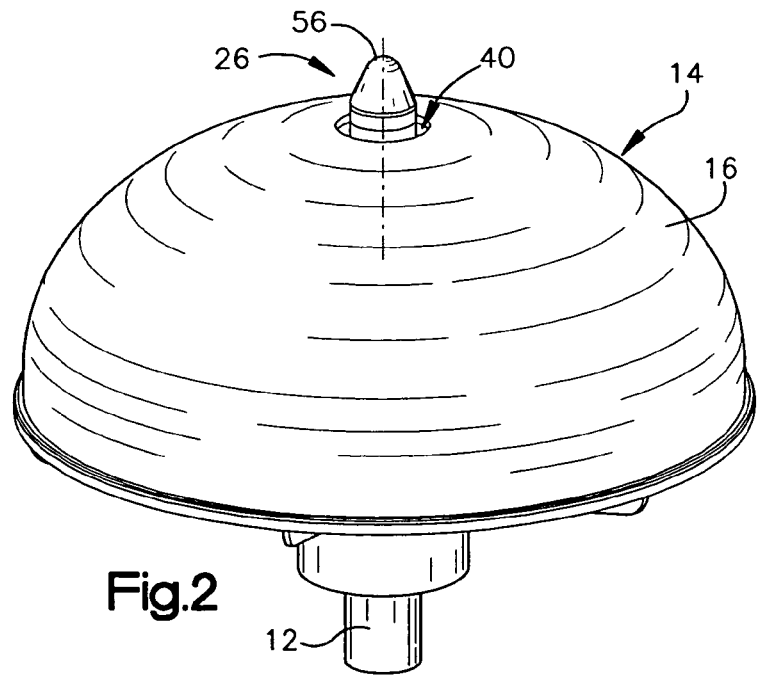
FIG. 2 is an oblique view of the lightning protection system of FIG. 1.

Referring initially to FIGS. 1 and 2, an air terminal lightning protection device 10 includes a central rod 12 and a conductive shell 14 having a curved conductive surface 16. The central rod 12 is electrically coupled to ground 20, in order to discharge current to the ground 20, for instance, receiving and discharging current from a lightning strike.

The central rod 12 includes a tip mount 22 for receiving one of a variety of tips 24, 26, and 28 that are parts of a tip set 30. The tip 26 is illustrated as coupled to the tip mount 22, but the tip mount is configured to receive any of the tips 24-28 of the tip set 30. The tip mount 22 may be an internally-threaded portion of the central rod 12, for receiving correspondingly externally-threaded ends of the tips of the tip set 30. Alternatively, the tip mount 22 may include any of a variety of connecting means for coupling tips to the central rod 12. Examples of various mechanisms for physically coupling together the central rod 12 and the tip set 30 include screws, bolts, mating surfaces, etc. It may be advantageous for the tip mount 22 to be such that various tips from the tip set 30 may be decoupled from the tip mount, for example to allow tips to be swapped out one for another. Alternatively, the connection between one of the tips 24, 26, or 28, and the central rod 12, may be substantially permanent, not allowing the tip to be easily decoupled from the central rod 12.

As described in greater detail below, the tips 24, 26, and 28 of the tip set 30 may be selected for use in the air terminal 10 so as to provide different electrical characteristics for the air terminal 10, for example for use in different installation situations.

The conductive shell 14 having the curved conductive surface 16 is located around but not in direct contact with the central rod 12. A central hole 34 in the conductive shell 14 allows placement of any of the various tips of the tip set 30 into the tip mount 22 of the central rod 12, without contact between and the conductive shell 14. As shown, the conductive shell 14 has a shape corresponding to the upper half of an oblate spheroid. An oblate spheroidal shape, with its relatively flattened upper portion, has been found to provide advantageous performance of the air terminal 10, relative to spherical or hemispherical shapes. It will be appreciated, however, that the conductive shell 14 may have any of a variety of other suitable shapes.

A support 36 of insulating material is attached or otherwise connected to the central rod 12, and provides support and proper alignment for the conductive shell 14.

As seen in FIG. 2, when the tip 26, or other of the tips 24 and 28 of the tip set 30, are installed in the tip mount 22 of the central rod 12, there is a concentric annular gap 40 between a central portion of the tip, and an inner edge 42 of the conductive shell 14. The annular gap 40 provides a spark gap that is used to initiate an upward leader or streamer, as described in greater detail below. To prevent premature sparking across the annular gap 40, an electrical connection 46 is provided between the conductive shell 14 and the central rod 12. The electrical connection 46 may include an impedance unit 48 and a trimming capacitor 50. The impedance unit 48 may include one or more resistors, simply providing resistance to current flow between the conductive shell 14 and the central rod 12 that is directly proportional to the voltage difference between the conductive shell 14 and the central rod 12. Alternatively, as described further below, the impedance unit 48 may be a variable impedance unit, providing an impedance (resistance) that is a non-constant or more complicated function of the voltage difference between the conductive shell 14 and the central rod 12.

Parts of the tips 24-28 protrude above the conductive shell 14, as illustrated in FIG. 2. The protrusion of the tips 24-28 may be approximately 25 millimeters when installed in the tip mount 22 in the central rod 12. More broadly, the tip protrusion may be from about 0 millimeters (no protrusion) to about 100 millimeters above the top of the conductive shell 14.

The conductive shell 14 may have any of a variety of suitable sizes. In one example embodiment, the conductive shell 14 may be one half of an oblate spheroid, with a diameter of about 250 millimeters and a depth of about 90 millimeters. More broadly, the diameter may be from about 50 millimeters to about 1 meter, and the depth (height) may be from about 0.1 to about 0.5 of the diameter.

The air terminal 10 may have properties such that it can be positioned so as to produce substantially no corona emissions in the quasi-static electric fields before approach of a downward leader from a cloud as part of a lightning strike. The air terminal 10 may be configured to "sense" the approach of a downward leader and to act in a manner to reduce further the risk of unwanted corona generation. The terminal 10 may "recognize" when the ambient field has sufficient strength to support upward leader formation and propagation. The air terminal 10 may be configured to trigger emission of a streamer discharge with the assistance of a spark across the annular gap 40, when such conditions are met. In addition, the air terminal 10 may enhance the immediate electric field above to aid in upward propagation of a streamer. All this is accomplished with an air terminal 10 that does not require batteries or any other power supply, does not require a charging system, and does not utilize radiation or electronically active components.

In the next few paragraphs, general operating principles of the air terminal 10 are discussed. The general operating principles and sequence of events discussed below are thought to be correct. However, it will be appreciated that the actual operation of the air terminal 10 may deviate from the below-discussed manner in certain respects.

It will be appreciated that there will be an electrical field concentration in the vicinity of the air terminal 10, during a lightning storm. The electrical field concentration will be dependent upon the size, geometry, and height of the air terminal 10, as well as the dimensions and shape of the structure on which it is installed. For example, the electric field concentration or increase in density may depend upon the shape of the conductive shell 14, upon the radius of curvature of the tip 24-28 utilized, and/or the height of the air terminal 10 above the ground. The last of these depends in large measure on the height of the building or other structure upon which the air terminal may be mounted. The electric field concentration around the air terminal 10 decays with distance as the field returns to the ambient, unperturbed value of electric field. Modeling may be performed to determine the electric field intensification for the air terminal 10, as well as the decay distance (the distance over which the electric field returns to the ambient electric field value). The decay distance has a positive dependence upon the height of the air terminal 10, and upon the radius of curvature of the tip that is utilized. Of these, the height may be the dominant factor. However, for a given height above the ground, the electric field strength above a terminal with the highest intensification (smallest tip radius of curvature), decays more quickly to the ambient electric field strength. In such as quick-decay situation, any early formed streamer will find a rapidly decreasing field strength as it emerges from the tip 24-28 of the air terminal 10. Such a streamer may not have sufficient energy in the decaying electric field to progress into a leader (the amount of energy stored per unit volume in an electric field is proportional to the square of the field strength). Without sufficient energy to progress, the streamer would collapse, and continually re-emerge until the downward leader approached much more closely, so as to give the required energy for a streamer-to-leader conversion. However, a more blunt configuration, whether passive or triggering, with the lower field intensification, produces a much more linear or gradual decay, with field strength remaining above the ambient value out to a much greater distance. Thus, a blunt configuration launching a streamer may have a higher probability of converting that streamer into a stable, propagating leader.

It will be appreciated that the above description presents a certain idealized picture, which merely provides some guidance for the optimum configuration of the air terminal 10. In natural conditions, certain complications may be present, such as the competition between several upward leaders, only one of which intercepts the downward leader from the cloud. These competing leaders may not be fully independent, and mutual repulsion or quenching of a leader, by earlier propagating leaders, may be observed and/or predicted. Further details regarding methods of determining electric field intensification factors and decay distances, may be found in U.S. Pat. No. 6,320,119.

As observed above, the electric field intensification and the decay distance may vary as a function of both the height of the air terminal 10 and the radius of curvature at the free end of the tip 24-28 utilized. Thus, it may be desirable to have different electrical characteristics for the air terminal 10 dependent upon circumstances of the installation, such as being dependent on the height H of a building or other structure upon which the air terminal 10 is installed. For instance the tip set 30 may have three or more tips 24-28, each with a different radius of curvature at a free end that is opposite the threaded end that engages the tip mount 22 of the central rod 12. For example, the tip 24 may have a free end 54 with a radius of curvature of about 3 mm, the tip 26 may have a free end 56 with a radius of curvature of about 6 mm, and the tip 28 may have a free end 58 with a radius of curvature of about 12 mm. More broadly, the tip 24 may have a radius of curvature from about 2 to about 5 mm, the tip 26 may have a radius of curvature from about 4 to about 9 mm, and the tip 28 may have a radius of curvature from about 8 to about 18 mm.

Even more broadly, the tip 24 may have a radius of curvature that is smaller than (sharper than) the tip 26, which may in turn have a radius of curvature which is smaller than that of the tip 28.

Figure 3:
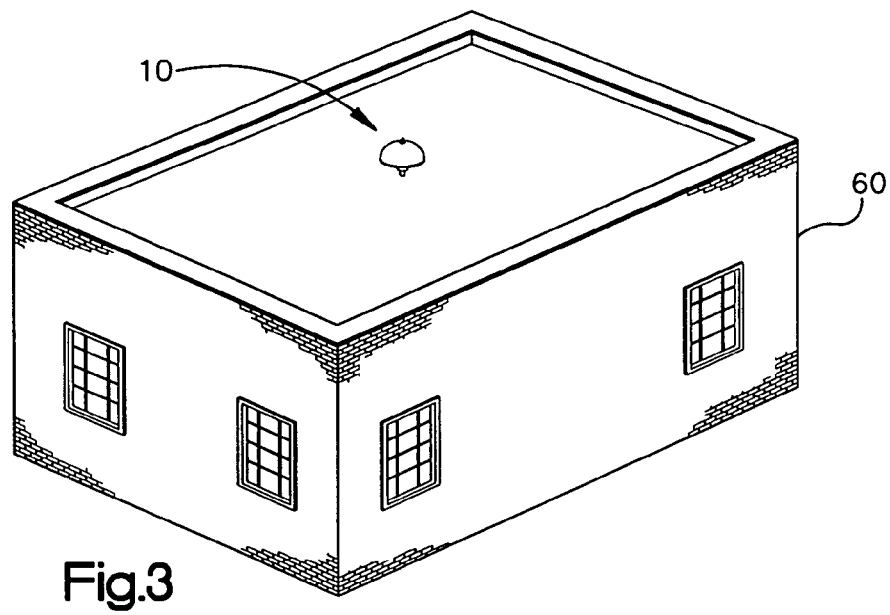
FIG. 3 is an oblique view of the lightning protection system of FIG. 1 atop a building or structure.

The lightning protection system 10 may be placed on the top of a building or structure 60, as illustrated in FIG. 3, with different tip used depending on the height of the building or structure 60. The tip 24 may be utilized for relatively low-height buildings or structures, for example, having a height of less than about 20 meters. The tip 26 may be used for buildings or structures having an intermediate height, for example, from about 20 to about 50 meters. The tip 28 may be used for buildings or structures having a relatively large height, for example, greater than about 50 meters.

As illustrated in FIG. 1, the tips 24 and 26 may have a conical shape, in that protruding portions which protrude beyond the conductive shell 14 have such a shape. The conical shape of course may have a rounded free end as described in the previous paragraph. The tip 28 may have a hemispherical shape to its protruding portion.

In addition, the tips 24, 26, and 28 of the tip set 30 may have different diameters in their respective central portions 64, 66, and 68, so as to produce different sizes of annular gaps between the tips 24-28 and the inner edge 42 of the conductive shell 14. The larger the annular gap 40, the more voltage is required for a spark to jump the gap, thereby initiating formation of an upward streamer. It may be desirable to have larger annular gaps for installations where the air terminal 10 is closer to the ground, for example, upon lower-height buildings or structures. The tip 24 may thus have a smaller diameter (larger spark gap) than the tip 26, which may in turn have a smaller diameter (larger spark gap) than the tip 28. For example, the tip 24 may be sized so as to give a spark gap from about 4 to about 6 mm, or approximately 5 mm. The tip 26 may be sized so as to give a spark gap from about 3 to about 5 mm, or approximately 4 mm. The tip 28 may be sized to give a spark gap from about 2 to about 4 mm, or approximately 3 mm.

It will be appreciated from the discussion above that the combinations of tip radius of curvature and spark gap may be configured to complement one another. For instance, a relatively sharp-ended tip produces a high level of electric field intensification, with a relatively small decay distance. The spark gap may be made large for such a tip, in order to delay formation of a leader until the voltage difference between the conductive shell 14 and the central rod 12 has become sufficiently large. Thus, sparking and subsequent streamer formation may be delayed until the local electric field strength is sufficiently large to support propagation of the upward streamer or leader. Similarly, other combinations of the size of the annular or spark gap 40 and the radius of curvature, for the various tips 24-28, may be selected to complement one another.

The tip set 30 has been described herein as involving three separate tips 24-28, all of which have unique radii of curvature of their free ends, and unique diameters of their central cylindrical portions. It will be appreciated that the tip set 30 may alternatively have a greater or lesser number of tips. In addition, the tip set may be configured so that some of the tips have the same or substantially the same radius of curvature on their free end, and/or the same or substantially the same diameter of their central cylindrical portions.

As noted above, the electrical connection 46 may aid in controlling voltage buildup and other electrical characteristics in the conductive shell 14. In particular, current may flow from the conductive shell 14 to the ground 20 via the impedance unit 48 electrically connecting the conductive shell 14 and the grounded central rod 12. By allowing some flow of current from the conductive shell 14 to the ground 20, the conductive shell 14 is maintained in a grounded or close to grounded condition most of the time, such as during times when the ambient electric field is constant or substantially constant. This may prevent undesired sparking during periods where the electric field rises gradually, such as during periods of a lightning storm other than periods of nearby lightning formation. During periods of rapid rise in the ambient electrical field, such as during the nearby descent of a downward leader from the thundercloud, the voltage on the conductive shell 14 may rise far above that of the ground formation. Although some current does flow through the impedance unit 48 during such a rise, the transient rise in the ambient electric field is sufficient to produce a voltage rise in the conductive shell 14. When the voltage rise is sufficiently high, sparking occurs across the annular gap 40, as described above.

Figure 4:
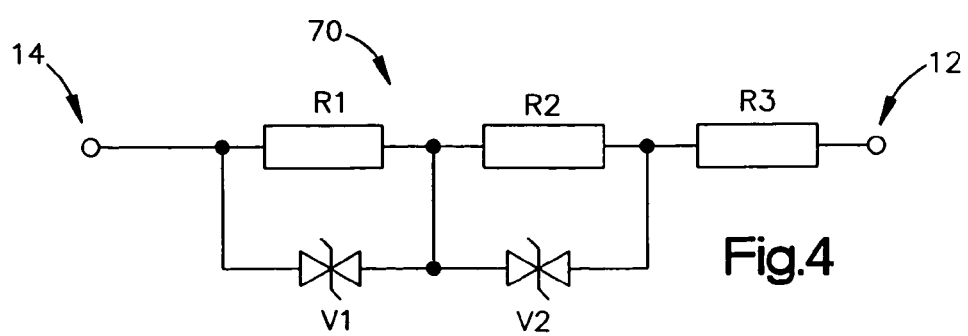
FIG. 4 is a circuit diagram of one embodiment of a variable resistance (impedance) unit that may be used as part of the lightning protection system of FIG. 1.

As noted above, the impedance unit 48 may be as simple as a single resistor, or multiple resistors coupled together in series and/or parallel. Alternatively, with reference to FIG. 4, the impedance unit 48 may be a variable impedance unit 70, with a resistance (impedance) that varies depending on the voltage difference between the conductive shell 14 and the grounded central rod 12. One schematic of a simple variable impedance unit 48 is shown in FIG. 4, where resistors R1 and R2 are placed in parallel with respective transorbs or Zener diodes V1 and V2. An additional resistor R3 provides a certain minimum resistance for the variable impedance unit 48. At low levels of voltage difference, the resistance of the variable impedance unit 48 is the sum of the resistances of the various resistors R1-R3. However, when the voltage across the resistors R1 and R2 exceeds that of the breakdown voltage of their respective transorbs V1 and V2, current preferentially flows through the transorbs rather than the resistors, the transorbs V1 and V2 thereby providing less resistance to current flow after their breakdown voltages are exceeded. Thus the resistance of the variable impedance unit 48 drops from being the sum of the resistances of three resistors R1, R2, and R3, to being that of the resistor R3 not coupled in parallel with a transorb or Zener diode.

It will be appreciated that the variable impedance unit 48 shown in FIG. 4 is only one example of a wide variety of possible configurations of variable resistance or impedance devices. Many variations to a variable resistance unit will be realized by one skilled in the art. For example, there may be a greater or lesser number of parallel combinations of resistors and transorbs or Zener diodes. For instance, ten or more parallel combinations of resistors and Zener diodes are possible. As another example, it will be appreciated that the values of the resistors and the breakdown voltages of the transorbs or Zener diodes may be selected so as to achieve any of a variety of voltage-resistance characteristics. As one example, the variable resistance unit 48 may be configured so as to achieve two different resistances. Alternatively the breakdown voltages of the transorbs and the values of the resistances put into parallel with them, may be selected so as to provide three or more resistance levels for the variable resistance unit 48. Thus the resistance may decrease in a stepwise manner as the voltage difference increases. In addition, it will be appreciated that many other configurations of different types of electrical components may be made so as to achieve a resistance that is variable and a function of voltage.

It will be appreciated that the variable resistance unit 48 may be configured to synergistically interact with the configuration of the various tips 24-28 of the tip set 30, so as to achieve desired spark generation characteristics of the air terminal 10 for each of the tips 24-28 of the tip set 30 that may be installed therein. For example, when the tip 24, with the lowest radius of curvature and the largest spark gap, is installed in the air terminal 10, It may be desirable to have a lower resistance than when the tip 28, with the largest radius of curvature and the smallest spark gap, is installed. Since the larger spark gap associated with the tip 24 requires a larger voltage difference between the conductive shell 14 and the grounded central rod 12 to produce sparking across the gap, the variable impedance unit 48 shown in FIG. 4 may be used to change the resistance relative to that encountered when the other tips 26 and 28 are used.

The conductive shell 14 may be made of a material that is sufficiently strong so as to be able to withstand a substantial lightning strike. For example, the conductive shell 14 may be made of stainless steel having a thickness of at least about 2 mm, at least about 3 mm, or approximately 3 mm. It will be appreciated that alternatively the conductive shell 14 may be made of another material, such as aluminum or copper.

Figure 5:
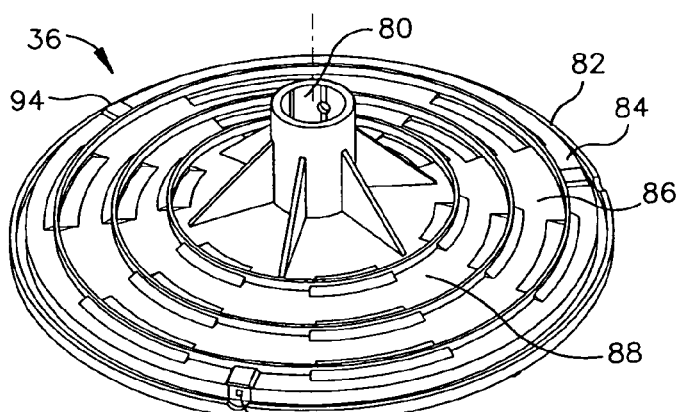
FIG. 5 is an isometric view of a support that is part of the lightning protection system of FIG. 1.
Figure 6:
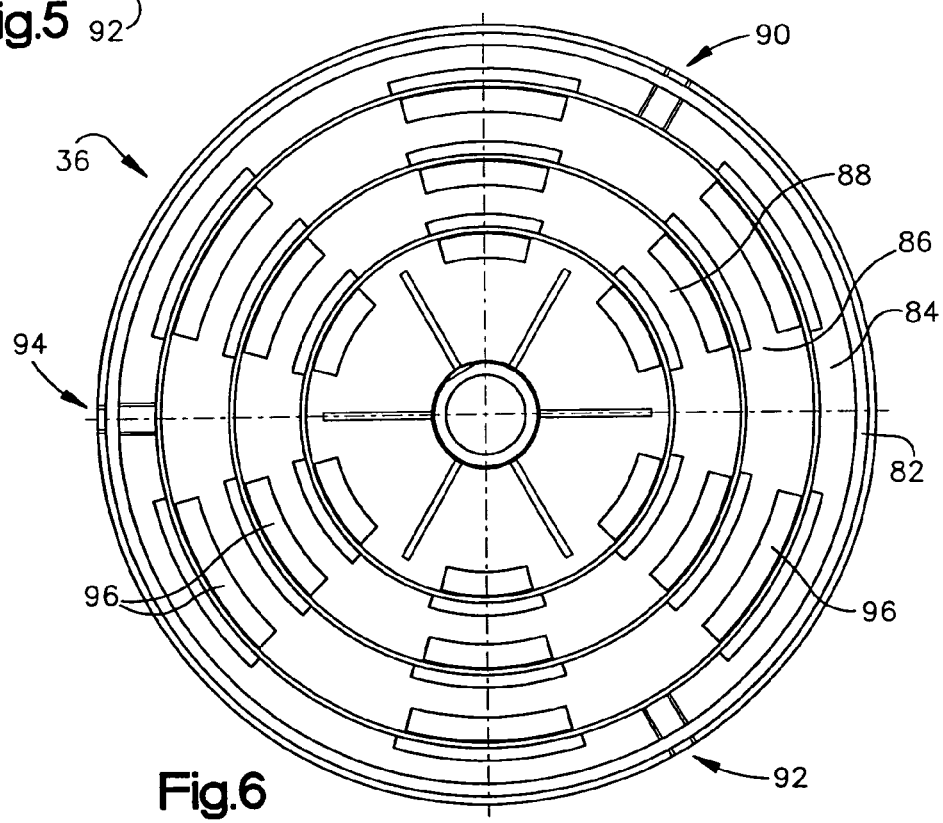
FIG. 6 is a plan view of the support of FIG. 5.
Figure 7:
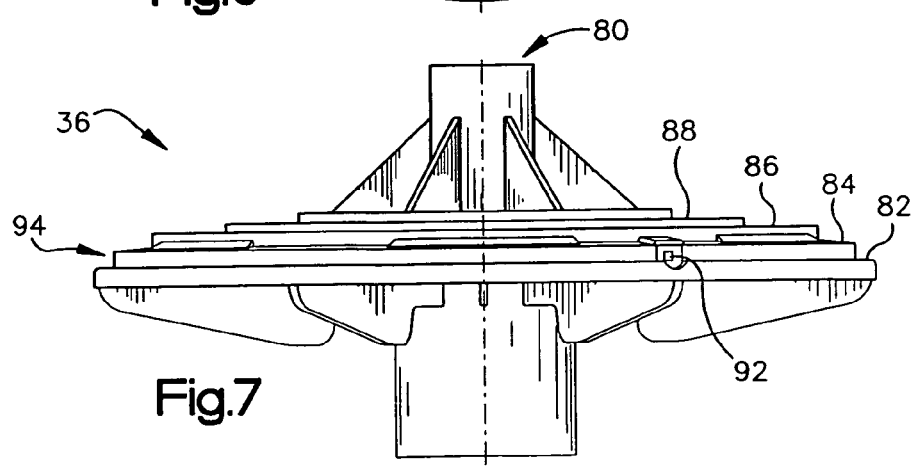
FIG. 7 is a side view of the support of FIG. 5.

FIGS. 5-7 show certain details of the insulating support 36. The support 36 may have a central hole 80 for receiving the grounded central rod 12, and for coupling to the central rod 12. The support 36 may have a series of platforms 82, 84, 86, and 88, which may be used to increase the path length between the conductive shell 14 and the grounded central rod 12. The support 36 may have a number of attachment points 90-94 for receiving fasteners for coupling the conductive shell 14 to the support 36. The conductive shell 14 may be attached to the support 36 by use of suitable fasteners, for example, by use of 6-g stainless steel self-tapping fasteners. The support 36 has vents 96 at various locations. The vents 96 facilitate drainage of water from and allow escape of gases from the interior the device 10, while preventing a person from peering into the interior of the device 10.

The support 36 may be made of any of a variety of insulative materials, for example polypropylene or other suitable plastics. The support 36 may be fabricated by suitable methods, for example, injection molding. The polypropylene material utilized may be a combination glass- and mineral-filled polypropylene. Such material has good physical strength, good dielectric strength, good electrical tracking properties, is non-hydroscopic, is UV stable, and is heat resistant.

It will be appreciated that the various aspects of the air terminal 10 described above, e.g., the ability to select tips with varying radius of curvature (varying characteristics of the electric field in the vicinity of the air terminal 10) and varying diameters (varying the spark gap and thus the voltage difference required to initiate sparking and streamer creation), and the variable impedance unit (further affecting the electrical characteristics of the air terminal 10), may synergistically interact with one another so as to allow the air terminal 10 to be configurable or otherwise optimized to produce desirable electrical field conditions and timing of streamer initiation, so as to produce desirable characteristics for lightning interception. The air terminal 10 with its curved conductive surface 16 may act dynamically to minimize corona during the close approach of a downward leader. This may occur due to the ability of the conductive shell 14 to float upwardly in voltage, by use of capacitive coupling to the approaching leader. The rise in voltage in the same polarity as the downward leader acts to reduce, on average, the electric field in the vicinity of the air terminal 10. This may act to eliminate or substantially reduce corona in the dynamic phase of leader approach. When a flashover or spark point is achieved between the conductive shell 14 and the central grounded rod 12, the resulting spark may provide free electrons in avalanche mode, with the conductive shell 14 simultaneously being grounded through the sparking process. The grounding causes an increase in the electric field above the air terminal 10, at a time when there is virtually no space charge effect. Streamer formation is enhanced by the liberation of free electrons, the ionization created by the arc, and the instant increase in the electric field ahead of the streamer. In the dynamic phase during the near approach of a downward leader, the electric field is intensified so as to have a field strength to cause a corona and ongoing development into a streamer without the impediment of an intervening space charge.

By selection of a tip from the step set 30, the configuration of the air terminal 10 may be advantageously tailored to desired electrical characteristics for a specific environment, such as characteristics based on the size (height and/or diameter) of a building or structure to be protected. In addition, the air terminal 10 described herein offers certain other advantages, including increased strength in the conductive shell 14 so as to enable it to survive substantial lightning strikes. The various improvements in the air terminal 10, such as selection of tip radius of curvature and/or diameter, and use of the variable impedance unit, may synergistically combine together to produce an air terminal with desired electrical characteristics, both in terms of electrical fields created, and the timing of sparking to create streamers propagating in such electric fields.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A lightning protection device comprising:
   a grounded central rod, wherein the central rod includes a tip mount at one end;
   a conductive tip coupled to the central rod at the tip mount;
   a curved conductive shell capacitively spaced from the tip and the central rod, with an annular gap between the conductive shell and the tip that functions as a spark gap; and
   an electrical connection joining the conductive shell to ground;
   wherein the conductive tip is one of a set of tips that may be coupled to the tip mount of the central rod, wherein the tips impart different electrical characteristics to the lightning protection device;
   wherein the set of tips includes tips with different diameters, thereby producing annular gaps of different widths when coupled to the tip mount;
   wherein the set of tips includes tips with different radii of curvature at free ends opposite ends for coupling to the tip mount;
   wherein the set of tips includes at least three tips with unique diameter-radii combinations;
   wherein each of the tips has a unique radius of curvature;
   wherein each of the tips has a unique diameter; and
   wherein the tip set includes:
      a first tip having a first radius of curvature, and producing a first annular gap when coupled to the tip mount;
      a second tip having a second radius of curvature, and producing a second annular gap when coupled to the tip mount; and
      a third tip having a third radius of curvature, and producing a third annular gap when coupled to the tip mount;
   wherein the first radius of curvature is less than the second radius of curvature;
   wherein the second radius of curvature is less than the third radius of curvature;
   wherein the first annular gap is greater than the second annular gap; and
   wherein the second annular gap is greater than the third annular gap.

2. The device of claim 1, wherein the shell is a stainless steel shell.

3. The device of claim 2, wherein the stainless steel shell has a thickness of at least about 3 mm.

4. The device of claim 1, further comprising an insulating support connected to both the conductive shell and the central rod.

5. The device of claim 4, wherein the insulating support is vented.

6. The device of claim 1, wherein at least one of the tips has a free end with a generally conical shape; wherein the free end is a protruding end that protrudes from the curved conductive shell when the tip is coupled to the tip mount.

7. The device of claim 6, wherein at least another of the tips has a free end with a generally hemispherical shape.

8. The device of claim 1, wherein the electrical connection is a connection between the conductive shell and the central rod.

9. The device of claim 8, wherein the electrical connection includes a variable impedance unit.

10. The device of claim 9, wherein the impedance (resistance) of the variable impedance unit is a function of a voltage difference between the conductive shell and the central rod.

11. The device of claim 10, wherein the impedance decreases at at least one point as the voltage difference increases.

12. The device of claim 10, wherein the electrical connection includes a transorb in parallel with a resistor.

13. The device of claim 1, wherein the shell has an oblate spheroidal shape.

14. The device of claim 13, wherein the shell is an upper half of an oblate spheroid.

15. The device of claim 13, wherein the shell has a height of from about 0.25 to 0.5 times a diameter of the shell.

16. The device of claim 1,
wherein the electrical connection is a connection between the conductive shell and the central rod; and
wherein the electrical connection includes a variable impedance unit.

17. The device of claim 1, wherein the tip set includes:
wherein the first radius of curvature is from 2 mm to 5 mm;
wherein the first annular gap is from 4 mm to 6 mm;
wherein the second radius of curvature is from 4 mm to 9 mm;
wherein the second annular gap is from 3 mm to 5 mm;
wherein the third radius of curvature is from 8 mm to 18 mm; and
wherein the third annular gap is from 2 mm to 4 mm.

18. The device of claim 17, wherein the tip set includes:
wherein the first radius of curvature is 3 mm;
wherein the first annular gap is 5 mm;
wherein the second radius of curvature is 6 mm;
wherein the second annular gap is 4 mm;
wherein the third radius of curvature is 12 mm; and
wherein the third annular gap is 3 mm.

* * * * *